United States Patent [19]

Tame

[11] Patent Number: 5,071,190
[45] Date of Patent: Dec. 10, 1991

[54] VEHICLE SEAT ASSEMBLY WITH FIXED POSITION HEAD REST AND VERTICALLY MOVABLE SEAT CUSHION AND BACK

[75] Inventor: Omar D. Tame, West Bloomfield, Mich.

[73] Assignee: Hoover Universal, Inc., Plymouth, Mich.

[21] Appl. No.: 662,486

[22] Filed: Feb. 28, 1991

[51] Int. Cl.⁵ .............................................. B60N 2/02
[52] U.S. Cl. .................................... 297/346; 297/391; 297/345
[58] Field of Search ............... 297/345, 346, 391, 395, 297/338, 347, 353

[56] References Cited

U.S. PATENT DOCUMENTS

| | | | |
|---|---|---|---|
| 3,741,513 | 6/1973 | Wilson | 297/346 |
| 4,401,343 | 8/1983 | Schmidt | 297/353 |
| 4,616,874 | 10/1986 | Pietsch et al. | 297/345 |
| 4,834,333 | 5/1989 | Saito et al. | 297/338 |

Primary Examiner—Kenneth J. Dorner
Assistant Examiner—Cassandra Hope
Attorney, Agent, or Firm—Harness, Dickey & Pierce

[57] ABSTRACT

A vehicle seat assembly is disclosed with a fixed position head rest and a vertically movable seat cushion and seat back. The head rest is positioned at the optimal location for visibility by a vehicle occupant. The seat cushion and seat back can be adjusted vertically to position the occupant's head in front of the head rest so that the occupant's eyes are at the optimum viewing height.

4 Claims, 4 Drawing Sheets

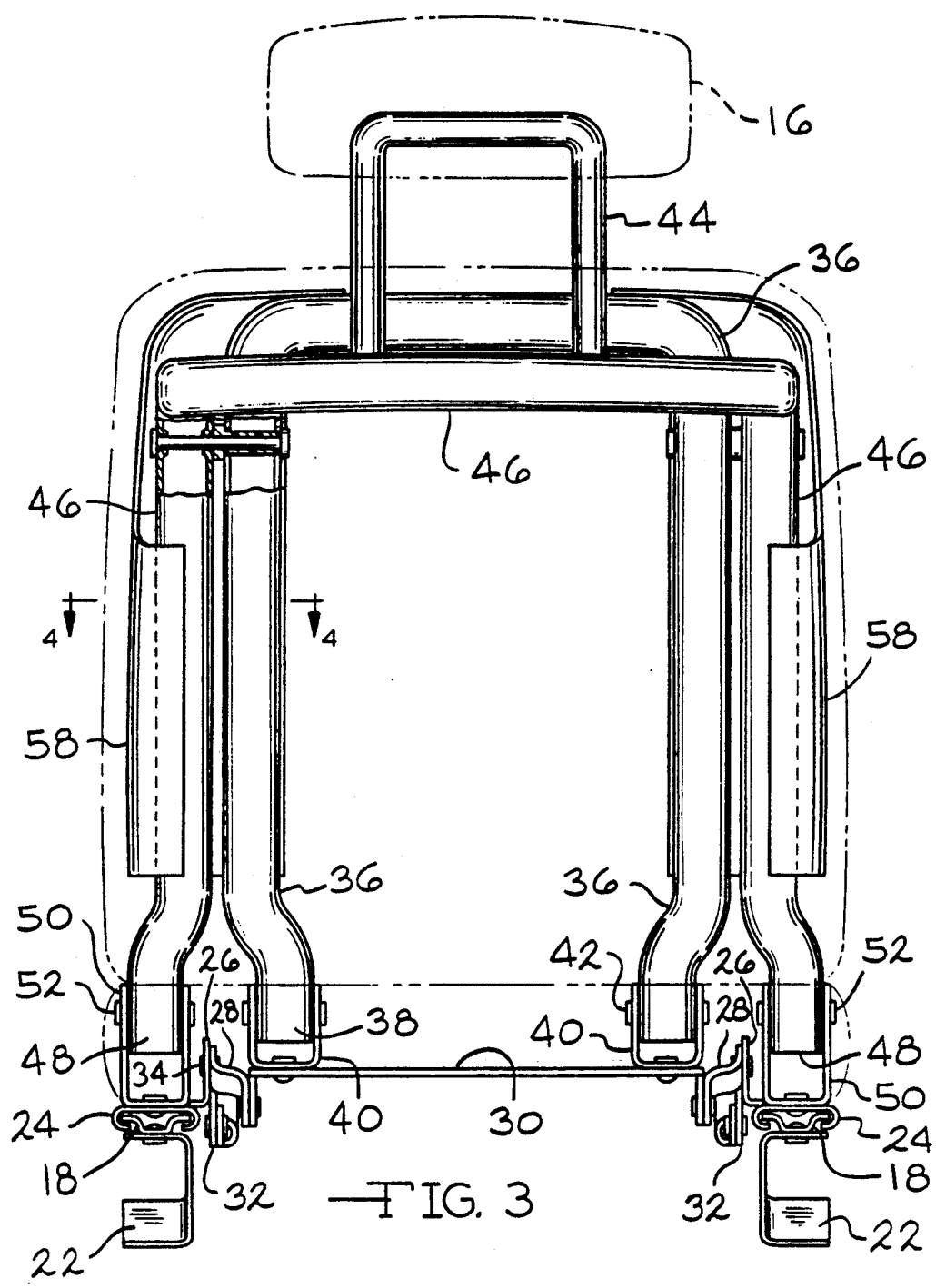

VEHICLE SEAT ASSEMBLY WITH FIXED POSITION HEAD REST AND VERTICALLY MOVABLE SEAT CUSHION AND BACK

BACKGROUND AND SUMMARY OF THE INVENTION

The present invention relates to a vehicle seat assembly and in particular to a seat assembly having a head rest vertically fixed in position with a vertically movable seat cushion and seat back. Regardless of the vertical position of the seat cushion and seat back, the head rest will remain in a predetermined position. Adjustment of the seat to place one's head in front of the head rest will result in placement of the occupant's eyes in the optimal position for visibility.

A seat assembly can be designed to vertically raise the seat cushion independently of the seat back or in conjunction with vertical movement of the seat back. If the seat cushion moves independently of the seat back, during adjustment the relative motion of the seat occupant with the seat back can cause discomfort and dishevel the seat occupant's clothing. Accordingly, it is often preferred that the seat back also be moved with the seat cushion.

Motor vehicles are typically designed with a particular line of sight for the seat occupant to have optimal vision both forward and rearward through a rear view mirror. To obtain the maximum benefit, the seat occupant must adjust the seat such that the occupant's eyes are at the optimum line of sight. The seat assembly, by having a vertically movable seat cushion enables the seat occupant to raise or lower his/her line of sight to the optimum position.

DETAILED DESCRIPTION OF THE INVENTION

The seat assembly of the present invention, having a fixed position head rest and a vertically movable seat cushion and seat, is shown in FIG. 1 and designated generally as 10. Seat assembly 10 includes a seat cushion 12 a seat back 14 extending upwardly at the rear of the seat cushion and a head restraint or head rest 16 disposed above the seat back. Seat assembly 10 is mounted on a frame comprising a pair of lower rails 18 with one rail along each lateral side of the seat assembly. The lower rails 18 each have fore and aft pedestals 20 and 22 respectively for attachment of the lower rail to a vehicle floor pan.

A pair of upper rails 24 with one along each side of the seat assembly are coupled to the lower rails 18 for sliding motion in a fore and aft direction relative to the lower rails. Fore and aft risers 26 extend upwardly from the upper rail and pivotally carry the fore and aft lift levers 28. Lift levers 28 are used to mount the seat cushion frame 30 to the upper rails 24 in a manner that provides for vertical lifting of the seat cushion frame relative to the upper rails.

Arms 32 of the lift levers 28 are attached to connecting link 35. The link is in turn coupled to a drive mechanism (not shown) used to rotate the lift levers 28 about their pivots 34 to raise the seat cushion frame 30 from the lowered position shown in FIG. 1 to the raised position shown in FIG. 2.

The seat back 14 contains a seat back frame 36 which is generally U-shaped as shown in FIG. 3 with the lower ends 38 of the frame pivotally connected to stanchions 40 extending upwardly from the seat cushion frame 30. The seat back frame 36 provides structure for the seat back 14. The pivotal connection of the seat back frame at pivots 42 enables the seat back to be rotated rearwardly to a reclined position (FIG. 6) as well as to rotate forwardly to a dump position (FIG. 5) enabling easier access to the area behind the seat assembly. Since the seat back frame 36 is coupled to seat cushion frame 30, the seat back will move vertically as the seat cushion is moved vertically.

The head rest 16 includes a frame 44 which is mounted to the head rest support 46, also a generally U-shaped structure, coupled at its lower ends 48 to stanchions 50 extending upwardly from the upper rail 24. The head rest support 46 is pivotally coupled to the stanchions 50 through pivots 52. Pivots 52 enable the head rest support to rotate with the seat back as it is moved to either the reclined or dumped positions.

A recliner mechanism, not shown for purposes of clarity, would be provided to secure the seat back frame 36 to the seat cushion frame 30 to lock the seat back in place and prevent it from rotating about pivot 42. In order to secure the head rest 16 and prevent its rotation about pivots 52, the head rest support 46 is interconnected with the seat back frame 36 to prevent relative rotation between the head rest and the seat back. This interconnection is in the form of a pair of pins 54 extending laterally from the head rest support and projecting through a slot 56 in the seat back frame. Rearward loading of the head rest, such as that experienced during a rear impact collision, is transferred by the pins 54 to the seat back frame 36.

The seat back structure as shown in greater detail in FIG. 4. A support pan 58 is coupled to the seat back frame 36 and extends outwardly and rearwardly therefrom. A foam body 60 is placed over the frame and pan 58 to form the padding for the seat back. The foam padding extends from the front of the seat back along the side and onto the rear of the seat back. An upholstery cover 62 is applied over the foam pad. The pan 58 separates the foam 60 from the head rest support 46 providing an open area 64 for the head rest support 46 to extend through, enabling motion of the head rest support relative to the seat back without interfering with the foam padding or other components of the seat back.

The pivots 42 and pivots 52 form parallel transverse axes across the seat assembly for rotation of the seat back frame and head rest support respectively. The locations of the seat back pivots 42 and the head rest support pivots 52 are such that regardless of the vertical position of the seat cushion frame 30, as the seat back is reclined or dumped forward, there is no contact or binding of the seat back frame and head rest support. This ensures trouble free operation of the seat.

By maintaining the head rest 16 in a fixed position, the head rest is aligned with the optimal line of sight 66 for visibility from the seat assembly. By vertically adjusting the seat assembly to position one's head properly in front of the head rest, the occupant's eye level will be at the optimal position for visibility. The seat assembly 10 of the present invention accomplishes this by providing a head rest that is at a fixed vertical position regardless of the vertical position of the seat cushion.

It is to be understood that the invention is not limited to the exact construction illustrated and described above, but that various changes and modifications may be made without departing from the spirit and scope of the invention as defined in the following claims.

I claim:

1. A seat assembly comprising:

a lower rail adapted to be secured to a supporting surface;

an upper rail slidingly coupled to said lower rail for movement in a fore and aft direction;

a seat cushion frame mounted to said upper rail;

means mounting said seat cushion frame to said upper rail for vertical movement of said seat cushion frame relative to said upper rail;

a seat back frame mounted to said seat cushion frame and extending upwardly from the rear thereof; and a head rest disposed above said seat back and a head rest support mounted directly to said upper rail whereby said head rest remains in a fixed position relative to said upper rail as said seat cushion frame is moved vertically.

2. The seat assembly of claim 1 further comprising means for coupling said head rest support to said seat back frame to transfer fore and aft loads applied to said head rest to said seat back frame, said coupling means providing for relative motion between said head rest and said seat back frame.

3. The seat back assembly of claim 2 wherein said coupling means comprises a pin extending laterally from one of said seat back frame or said head rest support and a slot formed in the other of said seat back frame or said head rest support with said pin projecting therein and slidable along the length of said slot whereby fore and aft loads applied to said head rest are transferred to said seat back frame.

4. The seat assembly of claim 1 further comprising first pivot means for attaching said seat back to said seat cushion frame and second pivot means for attaching said head rest support to said upper rail for rotation of said seat back frame and head rest about parallel transverse axes whereby said seat back frame and head rest can rotate rearward to a reclined position and forward to a dump position.

* * * * *

UNITED STATES PATENT AND TRADEMARK OFFICE
CERTIFICATE OF CORRECTION

PATENT NO.  : 5,071,190

DATED       : December 10, 1991

INVENTOR(S) : Omar D. Tame

It is certified that error appears in the above-identified patent and that said Letters Patent is hereby corrected as shown below:

Column 1, line 35, the following should be inserted:

It is an object of the present invention to provide a seat assembly with a head rest fixed vertically so as to be at the optimum line of sight so that the seat occupant can vertically adjust the seat to the optimum sight line.

The seat assembly of the present invention includes a vertically movable seat cushion and seat back with a head rest positioned above the seat back but fixed in a vertical position. During vertical adjustment of the seat cushion and seat back, the head rest remains in the fixed vertical position.

Further objects, features and advantages of the invention will become apparent from a consideration of the following description and the appended claims when taken in connection with the accompanying claims.

UNITED STATES PATENT AND TRADEMARK OFFICE
CERTIFICATE OF CORRECTION

PATENT NO. : 5,071,190

DATED : December 10, 1991

INVENTOR(S) : Omar D. Tame

It is certified that error appears in the above-identified patent and that said Letters Patent is hereby corrected as shown below:

<u>BRIEF DESCRIPTION OF THE DRAWINGS</u>

Figure 3 is a rear view of the seat of Figure 1;

Signed and Sealed this

First Day of June, 1993

Figure 1:
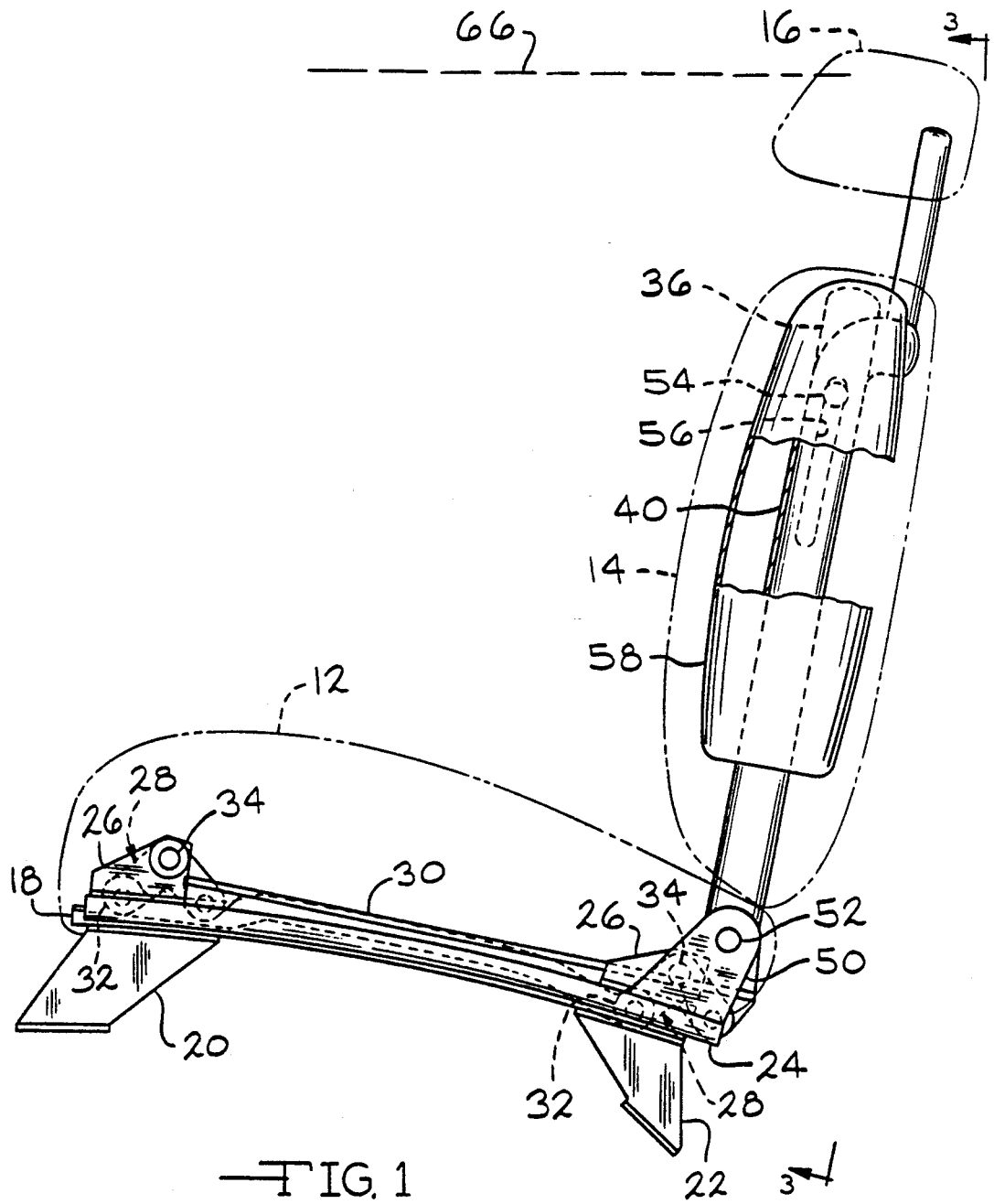
Figure 1 is a side elevational view of the seat of the present invention showing the seat cushion and seat back in a lowered position.
Figure 2:
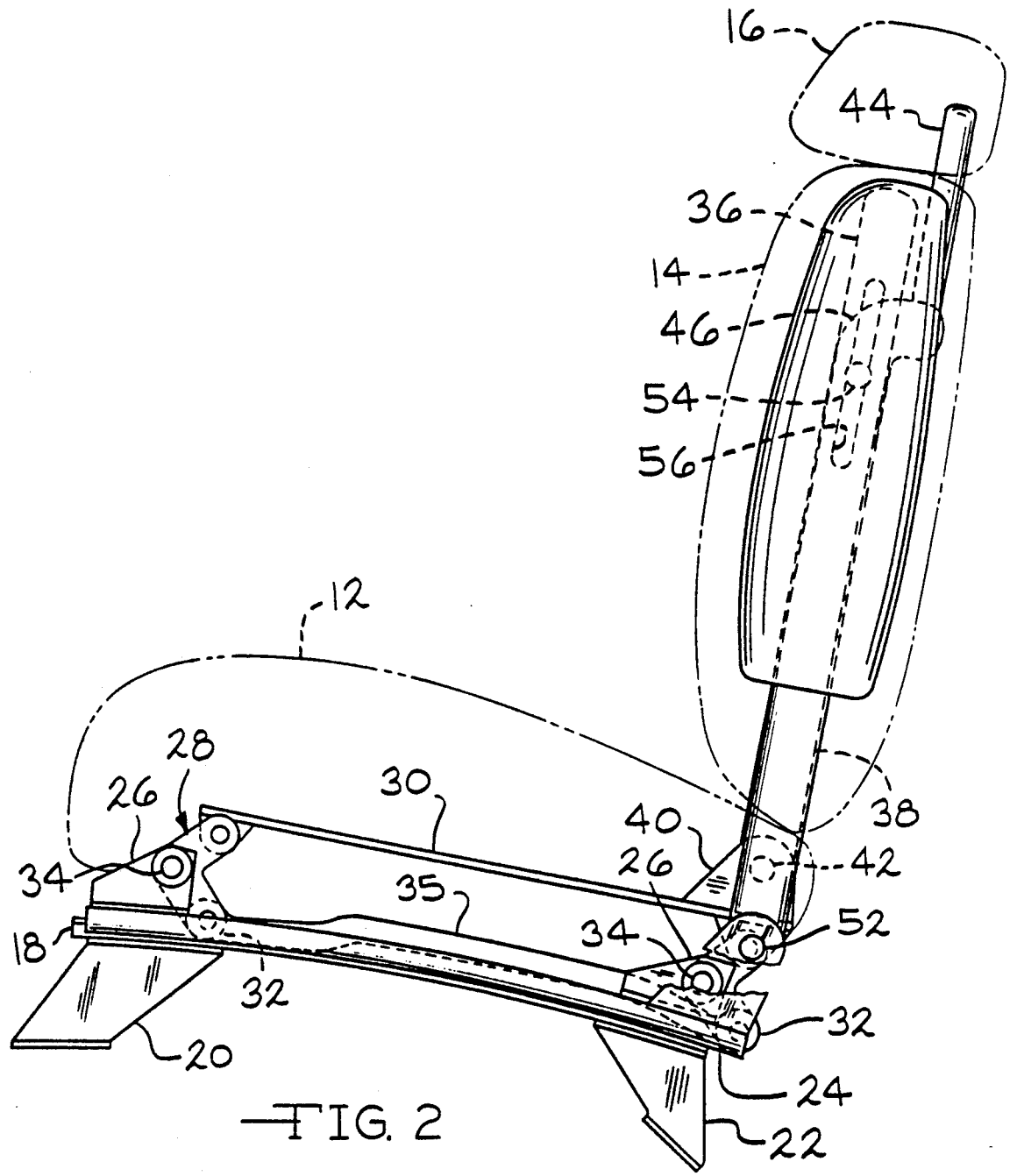
Figure 2 is a side elevational view similar to Figure 1 with the seat cushion and seat back in a raised position.
Figure 5:
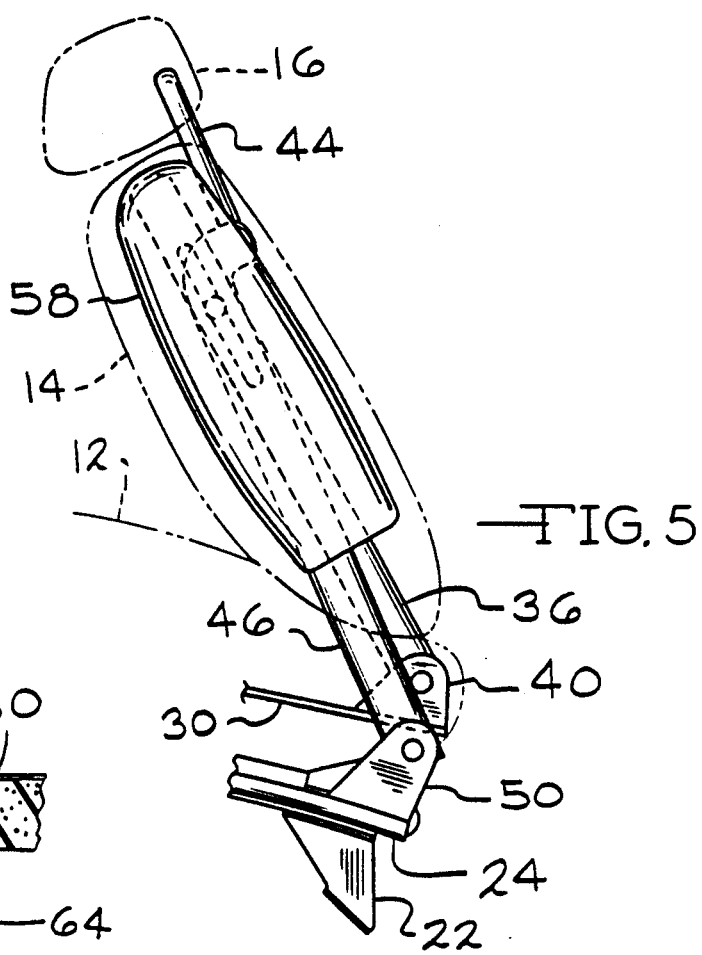
Figure 5 is a fragmentary side view showing the seat back rotated to a forward dump position.
Figure 4:
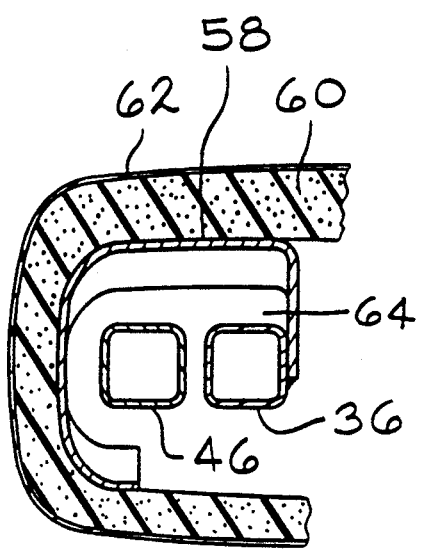
Figure 4 is a sectional view as seen from substantially the line 4-4 of Figure 3.
Figure 6:
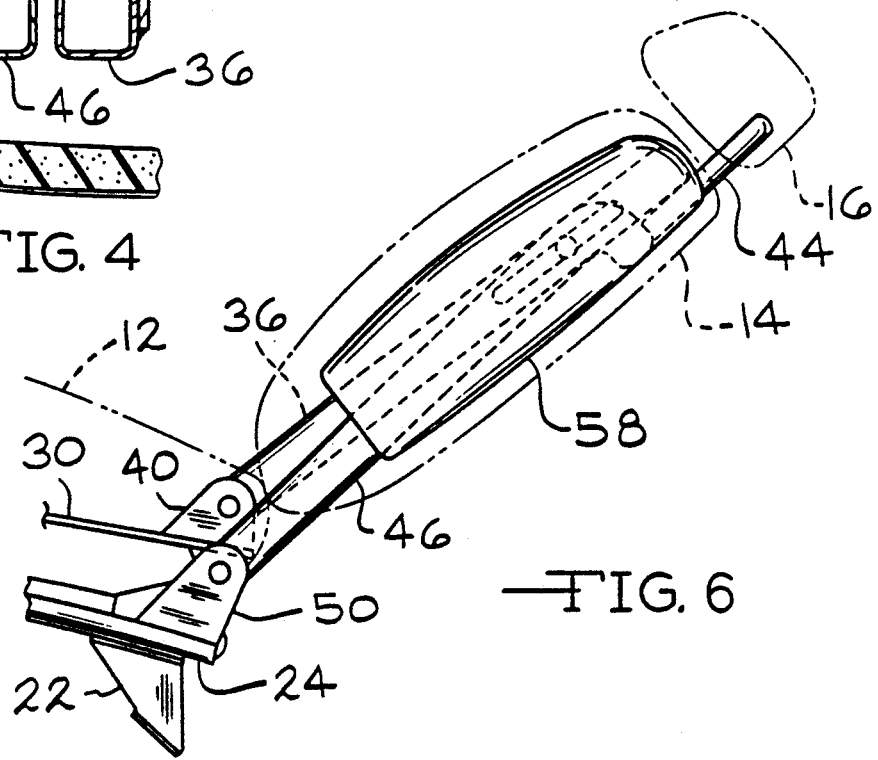
Figure 6 is a fragmentary side view showing the seat back rotated rearward to a reclined position.

Attest:

MICHAEL K. KIRK

*Attesting Officer*      Acting Commissioner of Patents and Trademarks